US012746707B2

(12) United States Patent
Martire

(10) Patent No.: US 12,746,707 B2
(45) Date of Patent: Sep. 29, 2026

(54) AIRFORMING CONSTRUCTIVE SYSTEM

(71) Applicant: Applied Physics, Inc., New York, NY (US)

(72) Inventor: Gianni Martire, New York, NY (US)

( * ) Notice: Subject to any disclaimer, the term of this patent is extended or adjusted under 35 U.S.C. 154(b) by 51 days.

(21) Appl. No.: 18/655,428

(22) Filed: May 6, 2024

(65) Prior Publication Data

US 2024/0286312 A1 Aug. 29, 2024

Related U.S. Application Data

(63) Continuation of application No. 17/173,206, filed on Feb. 10, 2021, now Pat. No. 12,005,607.

(51) Int. Cl.
*B28B 7/02* (2006.01)
*B28B 1/24* (2006.01)
(Continued)

(52) U.S. Cl.
CPC .................. *B28B 7/32* (2013.01); *B28B 1/24* (2013.01); *B28B 1/44* (2013.01); *B28B 7/065* (2013.01); *B28B 7/12* (2013.01); *B28B 1/523* (2013.01)

(58) Field of Classification Search
CPC .... B28B 1/24; B28B 1/44; B28B 7/12; B28B 7/32; B28B 7/348; B28B 7/06;
(Continued)

(56) References Cited

U.S. PATENT DOCUMENTS

| | | | | |
|---|---|---|---|---|
| 1,421,857 A * | 7/1922 | Store | E02D 15/06 264/32 |
| 2,769,202 A * | 11/1956 | Thompson | B29C 70/548 425/546 |

(Continued)

FOREIGN PATENT DOCUMENTS

| | | |
|---|---|---|
| DE | 1634293 A1 | 6/1970 |
| DE | 3442904 A1 | 6/1986 |

(Continued)

OTHER PUBLICATIONS

Office Action received in Japanese patent application No. 2023-573017, mailed on Sep. 9, 2025.

(Continued)

*Primary Examiner* — Emmanuel S Luk
(74) *Attorney, Agent, or Firm* — Cognition IP, P.C.; Edward Steakley; Justin White

(57) ABSTRACT

A composite material structure can be constructed using an airforming process that includes filling the inflated support mold with a fluid structural material and allowing the fluid structural material to harden within the support mold. Additional steps can include inflating the support mold with a first fluid, forming fluid escape outlets in the support mold, and removing the support mold after allowing the fluid structural material to harden. The first fluid can be air, the support mold can be a fiberglass resin, and/or the fluid structural material can be a concrete composite material. Fluid can escape through the fluid escape outlets during the filling. The finished structure can include multiple structural components formed from a homogenous concrete composite material and having curved and non-planar geometries. The concrete composite material can include aluminum alloy fibers.

20 Claims, 14 Drawing Sheets

(51) Int. Cl.
*B28B 1/44* (2006.01)
*B28B 1/52* (2006.01)
*B28B 7/06* (2006.01)
*B28B 7/12* (2006.01)
*B28B 7/32* (2006.01)

(58) Field of Classification Search
CPC ......... B28B 7/065; B28B 1/523; B28B 21/20; B28B 21/205; B28B 21/88; B28B 13/0275
See application file for complete search history.

(56) References Cited

U.S. PATENT DOCUMENTS

| | | | | | |
|---|---|---|---|---|---|
| 2,949,658 | A * | 8/1960 | Conn | B28B 7/32 | 249/83 |
| 3,021,569 | A * | 2/1962 | Lyman | B29C 51/10 | 264/220 |
| 3,257,481 | A | 6/1966 | Ming-Yang | | |
| 3,396,545 | A * | 8/1968 | Lamberton | E21D 11/10 | 405/230 |
| RE27,061 | E * | 2/1971 | Rubenstein | B28B 21/62 | 264/270 |
| 3,728,211 | A * | 4/1973 | Ball | C04B 20/0048 | 524/439 |
| 3,786,640 | A * | 1/1974 | Turzillo | E02B 3/127 | 405/18 |
| 4,021,972 | A * | 5/1977 | Choate | E04H 15/20 | 52/406.1 |
| 4,269,890 | A * | 5/1981 | Breitling | B29C 44/184 | 264/45.2 |
| 4,304,084 | A * | 12/1981 | Moreland | E04B 1/169 | 52/741.11 |
| 4,594,206 | A * | 6/1986 | Grafton | E02B 3/06 | 264/257 |
| 4,657,435 | A * | 4/1987 | Chang | E02D 29/063 | 405/150.1 |
| 4,854,843 | A * | 8/1989 | Takeda | B29C 33/50 | 425/440 |
| 5,106,440 | A * | 4/1992 | Tangeman | B29C 63/34 | 264/269 |
| 5,213,732 | A * | 5/1993 | Jevtic | B28B 7/06 | 264/225 |
| 5,339,574 | A * | 8/1994 | Downing | B29C 33/32 | 52/2.17 |
| 5,490,744 | A * | 2/1996 | McNeil | F16L 55/165 | 405/133 |
| 5,564,369 | A * | 10/1996 | Barber | A01K 63/006 | 405/23 |
| 5,836,265 | A * | 11/1998 | Barber | B28B 7/32 | 405/23 |
| 7,243,478 | B2 * | 7/2007 | Dawson | B65B 3/14 | 141/10 |
| 7,341,317 | B2 * | 3/2008 | Platner | B62D 29/002 | 301/124.1 |
| 7,976,760 | B2 * | 7/2011 | Gaudoin | B44C 5/005 | 264/317 |
| 8,388,336 | B2 * | 3/2013 | Gaudoin | B28B 7/34 | 425/89 |
| 9,056,411 | B2 * | 6/2015 | Birch | B29C 44/184 | |
| 2007/0187865 | A1 * | 8/2007 | Gaudoin | B28B 7/065 | 264/317 |
| 2010/0007066 | A1 * | 1/2010 | Gaudoin | B29C 33/405 | 425/449 |
| 2010/0025891 | A1 * | 2/2010 | Droll | C04B 41/009 | 106/819 |
| 2015/0069212 | A1 * | 3/2015 | Mason | B28B 7/32 | 249/63 |
| 2021/0381262 | A1 * | 12/2021 | Miksa | E04G 11/045 | |

FOREIGN PATENT DOCUMENTS

| | | | |
|---|---|---|---|
| DE | 102015119380 | A1 | 5/2017 |
| DE | 102018000396 | A1 | 7/2019 |
| GB | 975975 | A | 11/1964 |
| JP | H04111874 | A | 4/1992 |
| JP | 2003002707 | A | 6/2001 |
| JP | 2004003232 | A | 6/2002 |
| WO | 2022169638 | A1 | 8/2022 |

OTHER PUBLICATIONS

Examination Report received in counterpart German application No. 11 2022 001 027.4, mailed on Aug. 12, 2026.

* cited by examiner

AIRFORMING CONSTRUCTIVE SYSTEM

CROSS-REFERENCE TO RELATED APPLICATION

This application is a continuation of and claims priority to U.S. patent application Ser. No. 17/173,206, filed Feb. 10, 2021, and titled "AIRFORMING CONSTRUCTIVE SYSTEM," which application is hereby incorporated by reference in its entirety herein.

TECHNICAL FIELD

The present disclosure relates generally to the formation of structures, and more particularly to the formation of building, statues, and other structures made of hardened fluid structural material such as concrete.

BACKGROUND

Concrete has long been a common component in the formation of structures such as buildings, bridges, highways, and the like, as it is a material that is particularly strong with respect to compression forces and providing support therefor. Common uses of concrete structural elements include columns, beams, joists, panels, and slabs, among other flat, straight, and/or linear types of structures. Concrete can also be used to form curved and more complex structures, such as manholes, culverts, pipes, and other curved segments.

Unfortunately, exotic shaped structures are typically difficult and/or expensive to make using traditional concrete formwork techniques. Forming concrete structures having complex or curved surfaces can require additional materials, labor, and time. Such structures typically include the use of rebar and other internal reinforcements for a stronger building material, are cast or assembled in stages involving numerous structural elements such as those noted above, and are joined together by various different means and techniques.

Although traditional ways of forming structures have worked well in the past, improvements are always helpful. In particular, what is desired are complex structures and ways of forming complex structures that overcome traditional limitations on laborious and time consuming structure formation, particularly with respect to concrete structures.

SUMMARY

It is an advantage of the present disclosure to provide improved structures and methods of forming structures that overcome traditional limitations on structure formation. The disclosed features, apparatuses, systems, and methods provide improved structure formation solutions that involve the use of improved composite materials and improved methods of structure formation, especially with respect to concrete. These advantages can be accomplished at least in part through the use of aluminum alloy fiber reinforced concrete and/or the use of inflatable support molds during the formation of structures, such as concrete composite structures.

In various embodiments of the present disclosure, a structure forming system can include an inner support mold, an outer support mold, and one or more separator system components. The inner support mold can have a first thickness and a first injector, and the inner support mold can be configured to be filled with a fluid support or structural material via the first injector. The outer support mold can be arranged around the inner support mold and can have a second thickness and a second injector. The outer support mold can be configured to be filled with a fluid structural material via the second injector such that the fluid structural material fills the volume between the outer support mold and the inner support mold. The separator system component(s) can be coupled to the inner support mold and the outer support mold such that they hold apart the inner support mold from the outer support mold a set distance at one or more locations along the inner support mold and outer support mold. The structure forming system can be configured to form a hollow structure from the fluid structural material when the fluid structural material hardens within the structure forming system.

In various detailed embodiments, the structure forming system can include concrete. Each of the separator system component(s) can include a rigid separator pipe and contact boards at surfaces of the inner support mold and outer support mold. In some arrangements, the hollow structure can be a room and the hardened fluid structural material can form one or more walls of the room. Also, the outer support mold can include one or more pressure valves configured to release pressure when the outer support mold is filled with the fluid structural material.

In various further embodiments of the present disclosure, a concrete structure can include a first structural component formed from a homogenous material and a second structural component formed from the homogenous material. The homogenous material can include concrete and embedded fibers having a thickness of less than about 2 mm and a length of less than about 30 mm. The first structural component can have at least a first portion with a first curved and non-planar geometry, and the second structural component can have at least a second portion with a second curved and non-planar geometry that is substantially different than the first curved and non-planar geometry. In some arrangements, the first structural component and the second structural component can be integrally formed. In various detailed embodiments, the embedded fibers can include fibers having an aluminum alloy component. Also, the concrete structure can be formed using one or more inflatable support molds.

In still further embodiments of the present disclosure, various methods of forming a structure are provided. Pertinent process steps can include forming one or more fluid escape outlets in a first support mold, filling the first support mold with a fluid structural material, wherein fluid escapes through the one or more fluid escape outlets during the filling, and allowing the fluid structural material to harden within the filled first support mold, wherein the hardened structural material forms at least a portion of the structure.

In various detailed embodiments, further process steps can include wetting the first support mold prior to filling and removing the inflated first support mold after allowing the fluid structural material to harden. In some arrangements, the first support mold can be inflated with a first fluid prior to filling, wherein the first fluid escapes from the one or more fluid escape outlets during the filling. The first fluid can include air, and/or the first support mold can include a fiberglass resin balloon. The fluid structural material can include a fluid concrete composite material and the hardened structural material can include a hardened concrete composite material. The concrete composite material can include fibers mixed therein, and the fiber can have an aluminum alloy component. The aluminum alloy fibers can have a thickness of less than about 2 mm and a length of less than about 30 mm, although other sizes are also possible.

In various detailed embodiments, still further process steps can include inflating a second support mold with the first fluid, forming one or more fluid escape outlets in the second support mold, filling the inflated second support mold with the fluid structural material, wherein the first fluid escapes through the one or more fluid escape outlets during the filling, and allowing the fluid structural material to harden within the inflated second support mold, wherein the hardened structural material forms at least a portion of the structure. In some arrangements some support molds are filled only with air or another first fluid and not the fluid structural material. Process steps may also include designing the first support mold and creating the first support mold. In some embodiments, the formed structure can include at least a first structural component having a first curved and non-planar geometry and a second structural component having a second curved and non-planar geometry that is substantially different than the first curved and non-planar geometry. An additional process step can involve connecting the first support mold with an existing building foundation. Finished structures can include buildings, statues, or other structural components.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for airforming structures. These drawings in no way limit any changes in form and detail that may be made to the disclosure by one skilled in the art without departing from the spirit and scope of the disclosure.

DETAILED DESCRIPTION

Figure 1:
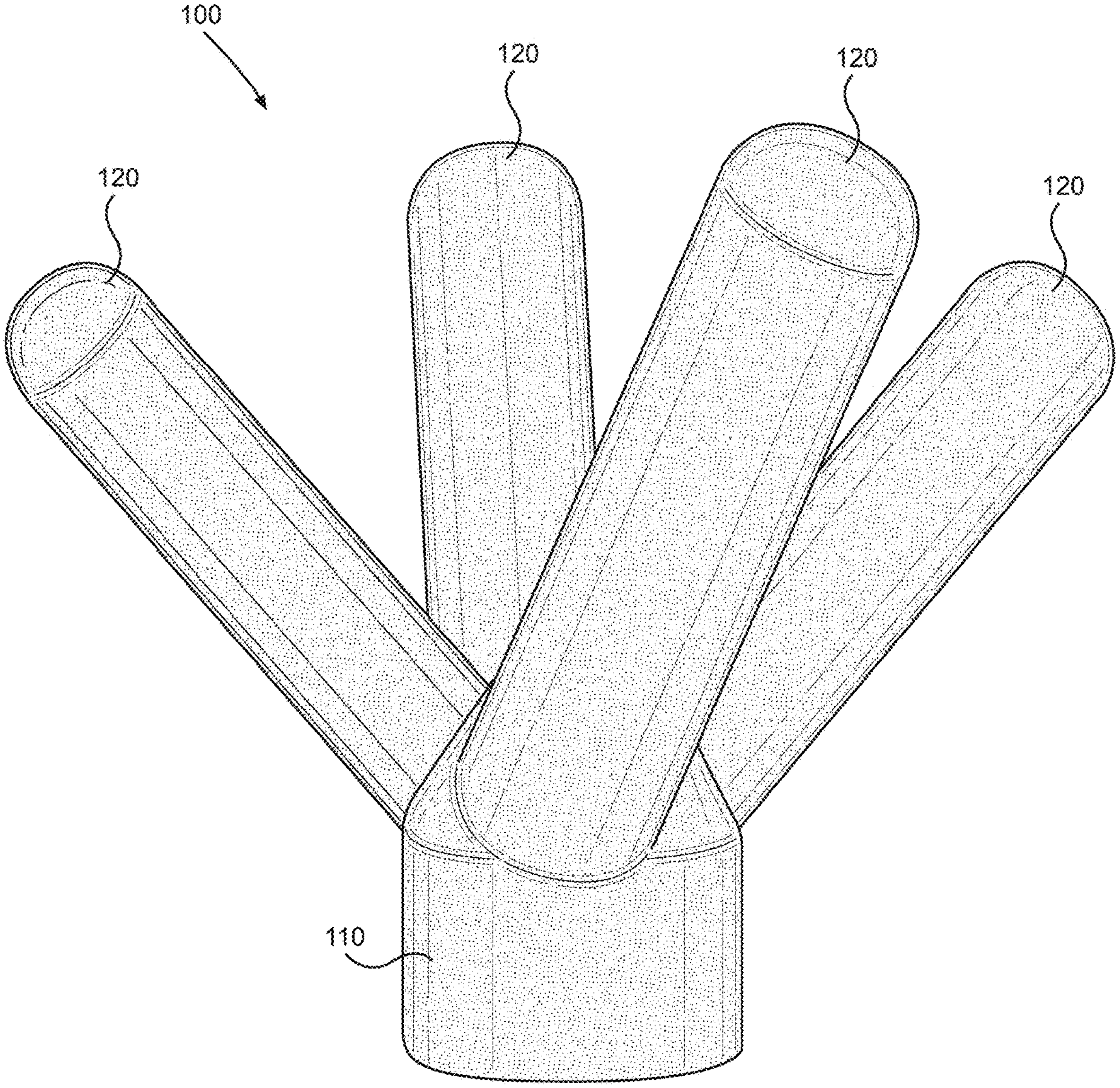
FIG. 1 illustrates in side perspective view an example base and support arm structure built by an airforming process according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for airforming structures, which can include buildings, statues, and other structural items. The disclosed embodiments can include various methods and techniques of forming three-dimensional structural elements using an "airforming process," as well as the three-dimensional structural elements themselves. In particular, the disclosed embodiments can utilize an inflated balloon or support mold of any size or shape that acts as a formwork to be filled with structural material, conferring a final shape to structural elements with minimal human intervention or labor. While the airforming structural support device or formwork can be a balloon, mold, or other similar device, all such formworks will generically be referred to as "support molds" for purposes of the present disclosure.

The disclosed embodiments provide a more economical alternative for the construction of complex and singular structures and structural elements, particularly those involving concrete or other similar materials, by transferring part of the labor cost to the manufacturing of a mold. Because the entire on-site structural formation process can take only about 72 hours or less, time saving is another attractive characteristic that can reduce the cost and impact of the disclosed construction process.

In various embodiments, a support mold can initially be filled with air, although any other suitable fluid may also be used. Accordingly, while the term “airforming” and various derivations thereof are used throughout the present disclosure, it will thus be understood that any suitable fluid besides air may be used for the support mold filling and formation process. In various embodiments, an inflated balloon or support mold can then be filled with a structural material fluid while the air or other inflating fluid is also discharged. Although such a structural material can be a concrete like hybrid material, such as the aluminum alloy fiber reinforced hybrid material disclosed herein, it will be understood that various other structural materials may alternatively be used, such as, for example, a plastic material, other molten material, or other materials that may solidify, such as water solidifying into ice, among other possible materials. The structural material fluid filling the mold can then be allowed to harden, after which the mold can then be removed to provide a finally formed structure or structural element.

In various alternative embodiments, which are merely illustrative and non-limiting in nature, the step of filling the support mold with air or an initial fluid can be skipped in favor of directly filling the support mold with the structural material itself. Additional steps can include designing the support mold and creating the support mold. Multiple support molds can also be used, with pertinent steps being repeated for each different support mold. The structural elements formed from each support mold can then combine to form an overall structure, such as a building, statue, or free-standing design, among other possible structures.

Starting with FIG. 1, an example base and support arm structure built by an airforming process is illustrated in side perspective view. Base and support arm structure 100 can be a singular structure built by an airforming process using a single balloon or support mold. Structure 100 can be, for example, a foundational support structure that can be used to form other structural components thereat or thereupon. As such, structure 100 can include a base 110 and a plurality of support arms 120 extending therefrom. The base 110 can be formed on the ground or a separate foundation, and one or more of the support arms 120 can be used to support one or more other components, some or all of which can also be formed using an airforming process.

Various materials can be used to form structure 100, and it is specifically contemplated that a fluid (e.g., wet) construction material can be used, with such a construction material being able to cure or harden to form a finished structure. In particular, concrete and concrete composite materials are specifically contemplated for the disclosed airforming processes. Traditional construction methods and techniques using concrete can be limited, however, and the disclosed airforming processes can be used to expand greatly the types of complex shapes that can be formed using concrete and concrete composite materials. Structure 100 is one example of a singular concrete or concrete composite structure that cannot be formed by traditional methods but can be formed by an airforming process as disclosed herein.

Figure 2:
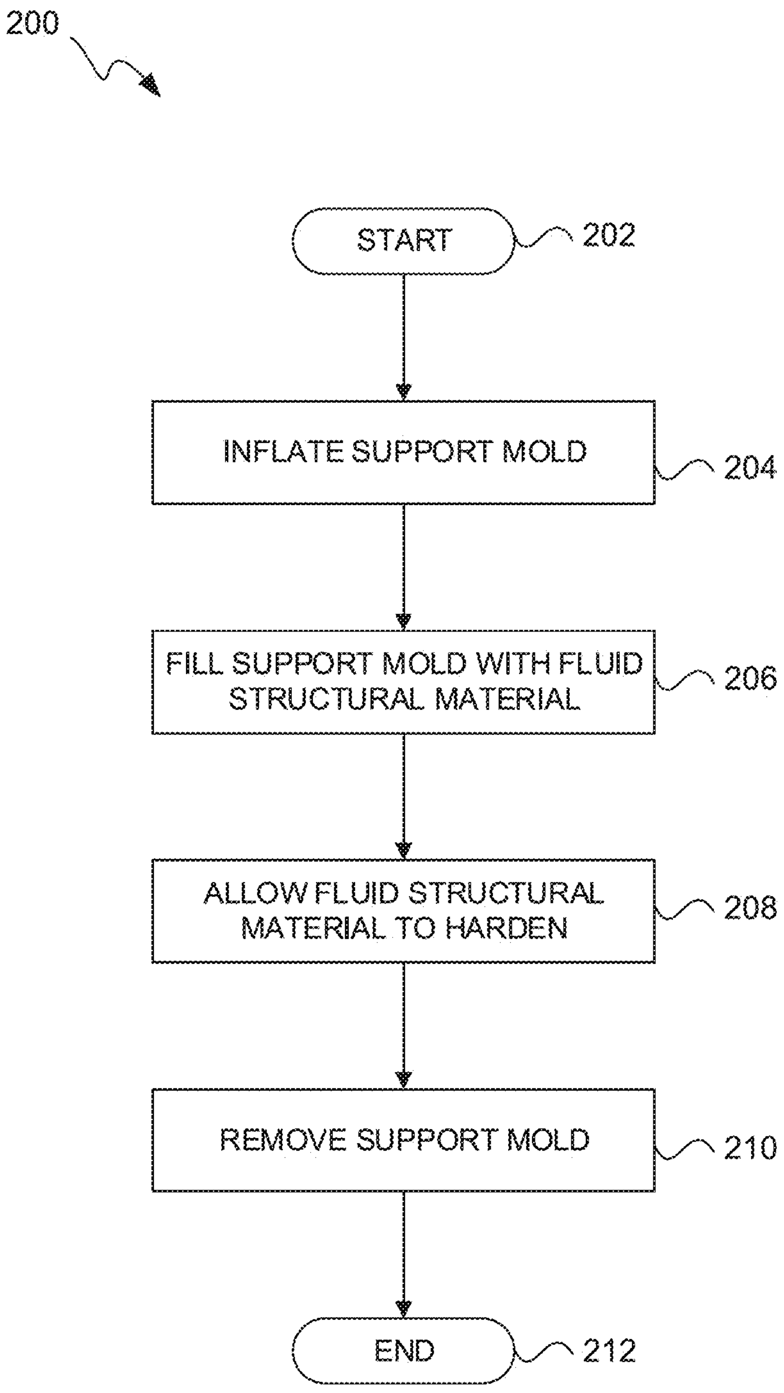
FIG. 2 illustrates a flowchart of an example method of creating a structure using an airforming process according to one embodiment of the present disclosure.

Turning next to FIG. 2, a flowchart of an example method 200 of creating a structure using an airforming process is provided. It will be readily appreciated that method 200 generally provides a broad overview, and that various steps and details are not provided at this point for purposes of simplicity. The structure can be a building or part of a building, a statue, a free-standing edifice, or a variety of other types of structures. After a start step 202, a first process step 204 can involve inflating a support mold. The support mold can be a fiberglass resin material arranged into a customized shape, for example, and air can be used to inflate the support mold, although other support mold materials and fluid inflation media can be used.

At a subsequent process step 206, the inflated support mold can be filled with a fluid structural material. Such a fluid structural material can be, for example, a fluid concrete composite material. In particular, a concrete composite having aluminum alloy fibers embedded therein can be used. In some arrangements, the air or other fluid used to inflate the support mold can escape via one or more fluid escape outlets while the support mold is being filled with the fluid structural material. Suitable aluminum alloy fibers can be produced, for example, by cutting portions of aluminum beverage cans into thin ribbon shapes, as noted below.

At a next process step 208, the fluid structural material can be allowed to harden, which can take place while the fluid structural material has filled the support mold and taken the shape of the support mold. In the case of concrete or a concrete composite material, for example, the fluid structural material can be allowed to harden for about 48 to 72 hours. Other time periods are also possible.

At a following process step 210, the support mold can then be removed from the hardened structural material, which results in just the final structure remaining. In some arrangements, the support mold can be a disposable single use support mold, which can be destroyed during the removal process. In other arrangements, the support mold can be a reusable support mold that can be carefully removed so as to preserve the support mold for future uses. In some arrangements, the support mold may also form part of the finished structure, such that it need not be removed (i.e., no step 210). The method then ends at end step 212.

Figure 3:
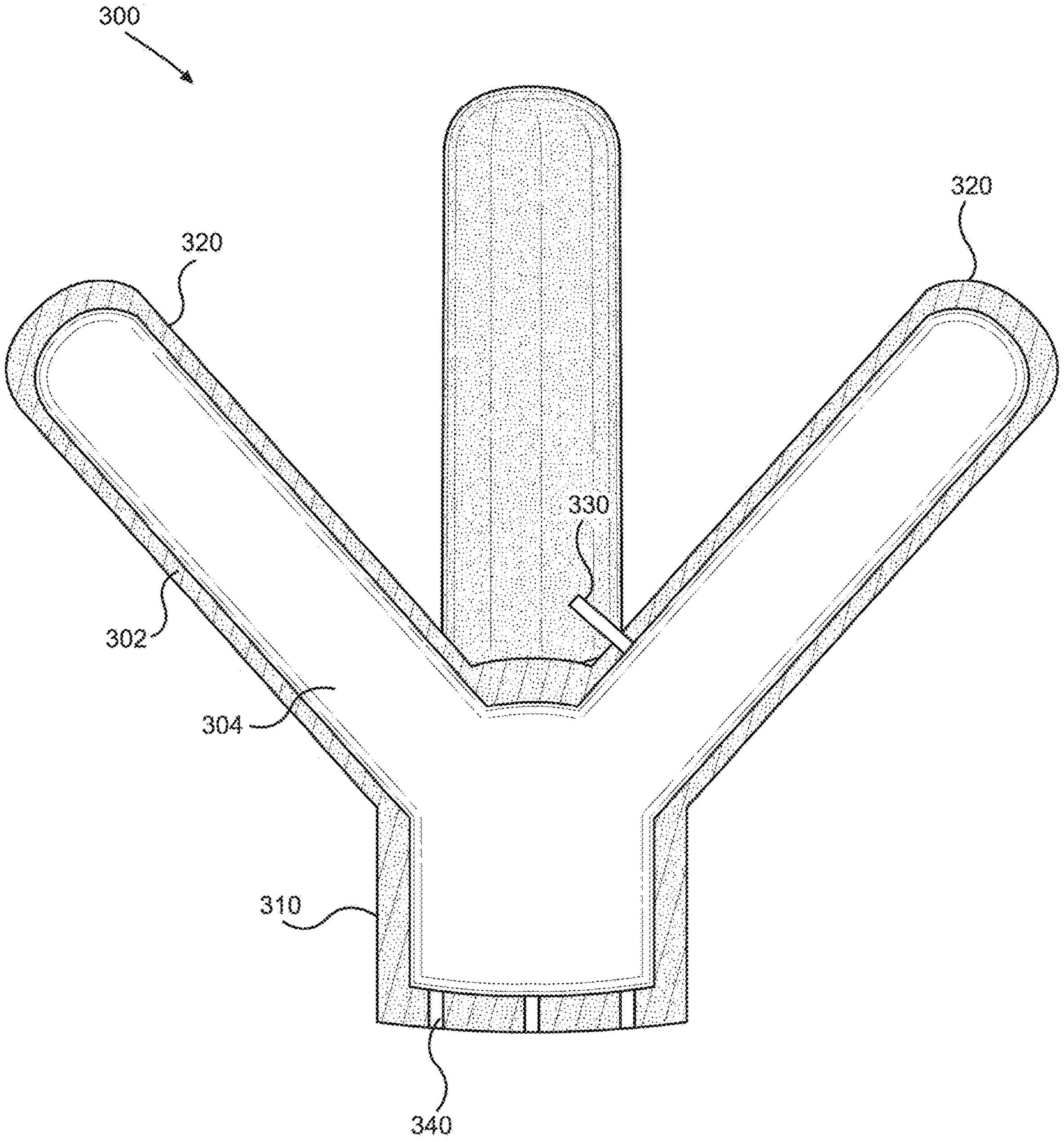
FIG. 3 illustrates in side cross-section view an example inflated mold during the creation of a structure using an airforming process according to one embodiment of the present disclosure.

Continuing with FIG. 3 an example inflated support mold during the creation of a structure using an airforming process is shown in side cross-section view. Support mold 300 can be a balloon inflated with air or another suitable fluid, for example, and can be used to form the base and support arm structure of FIG. 1. As such, support mold 300 can include a base region 310 and a plurality of support arm regions 320. When inflated, support mold 300 can include a thin layer 302 and an internal hollow region 304 filled with air or other fluid. This can be accomplished through one or more inlets 330, which may also be used to fill support mold 300 with the fluid structural material, such as a composite concrete material. One or more fluid escape outlets 340 can allow air or other fluid to escape during the construction process.

In some arrangements, the surface texture of the finished structure can be achieved or altered by adjusting the surface texture of the mold used to form the finished structure. For example, support mold 300 can have a customized texture at its inner surfaces where the fluid structural material fills the mold and then cures or hardens. When the inner surfaces of support mold are very smooth, then a smooth finish will be achieved at the outer surfaces of the finalized structure formed by the composite concrete or other fluid structural material. Conversely, a coarse support mold inner surface will result in a coarse surface texture on the finished structure.

Moving next to FIGS. 4-10B, various possible use cases are provided for the wide variety of structures that can be formed using the disclosed airforming processes. It will be understood that the various structures that can be created by way of airforming can be of virtually any shape and size, and that the various use cases disclosed herein are but a small sample of the myriad structures that can be formed. Structures can be based on a diversity of materials and may be formed in a variety of settings including, but not limited to, various indoor, outdoor, underwater, vacuum, outer space, and other environments. Structural materials can include anything that solidifies over time, such as, for example, concretes, plastics, molten metals and alloys, and water and other water-based fluids, among other possible materials. Various liquids that can be hardened due to chemical reactions may also be used.

Figure 4:
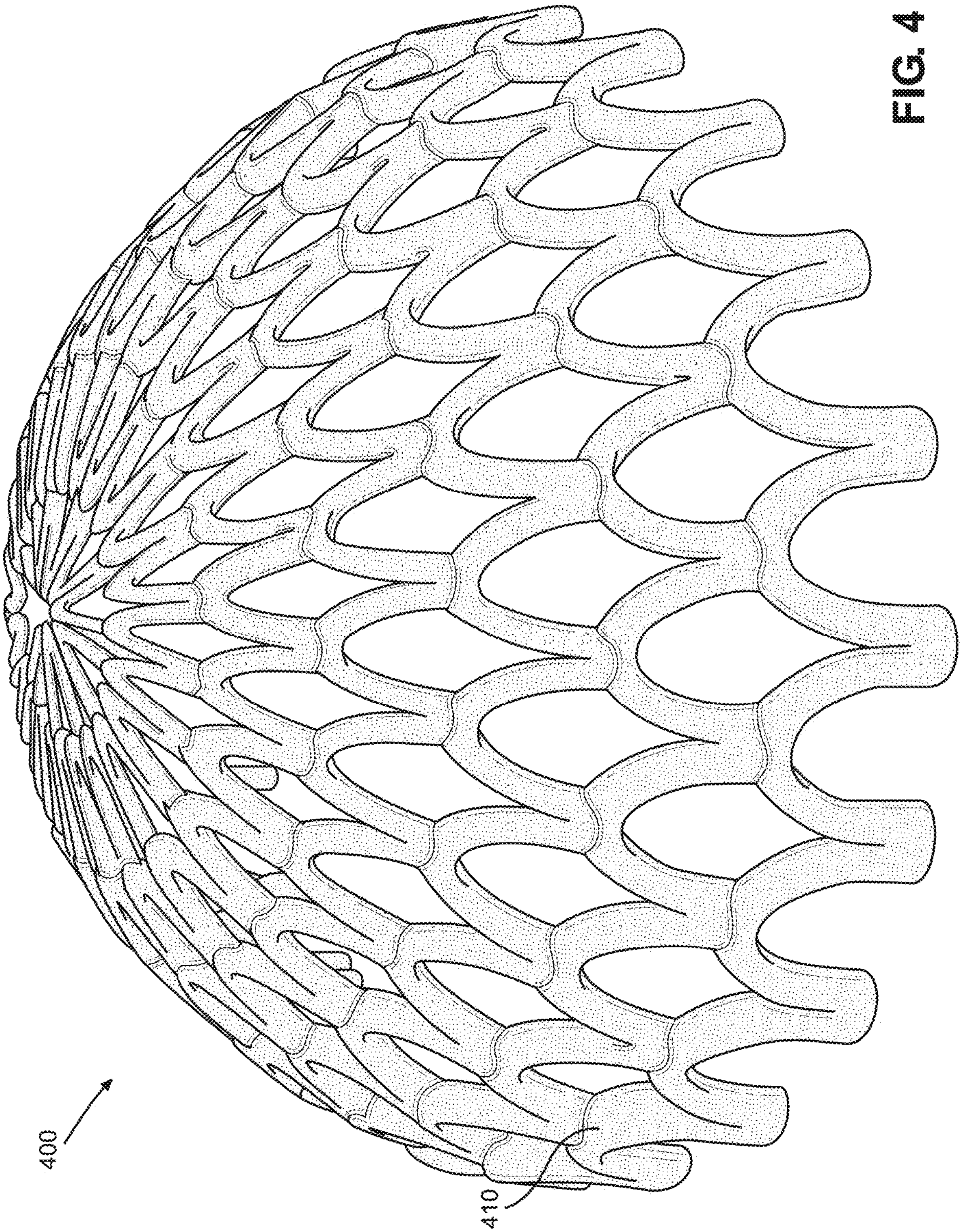
FIG. 4 illustrates in side perspective view an example arch series dome structure built by an airforming process according to one embodiment of the present disclosure.

FIG. 4 illustrates in side perspective view an example arch series dome structure built by an airforming process. Arch series dome structure 400 can be a singular structure built by an airforming process using a single balloon or support mold. Arch series dome structure 400 can be, for example, a dome fashioned from a series of many arches 410.

Figure 5:
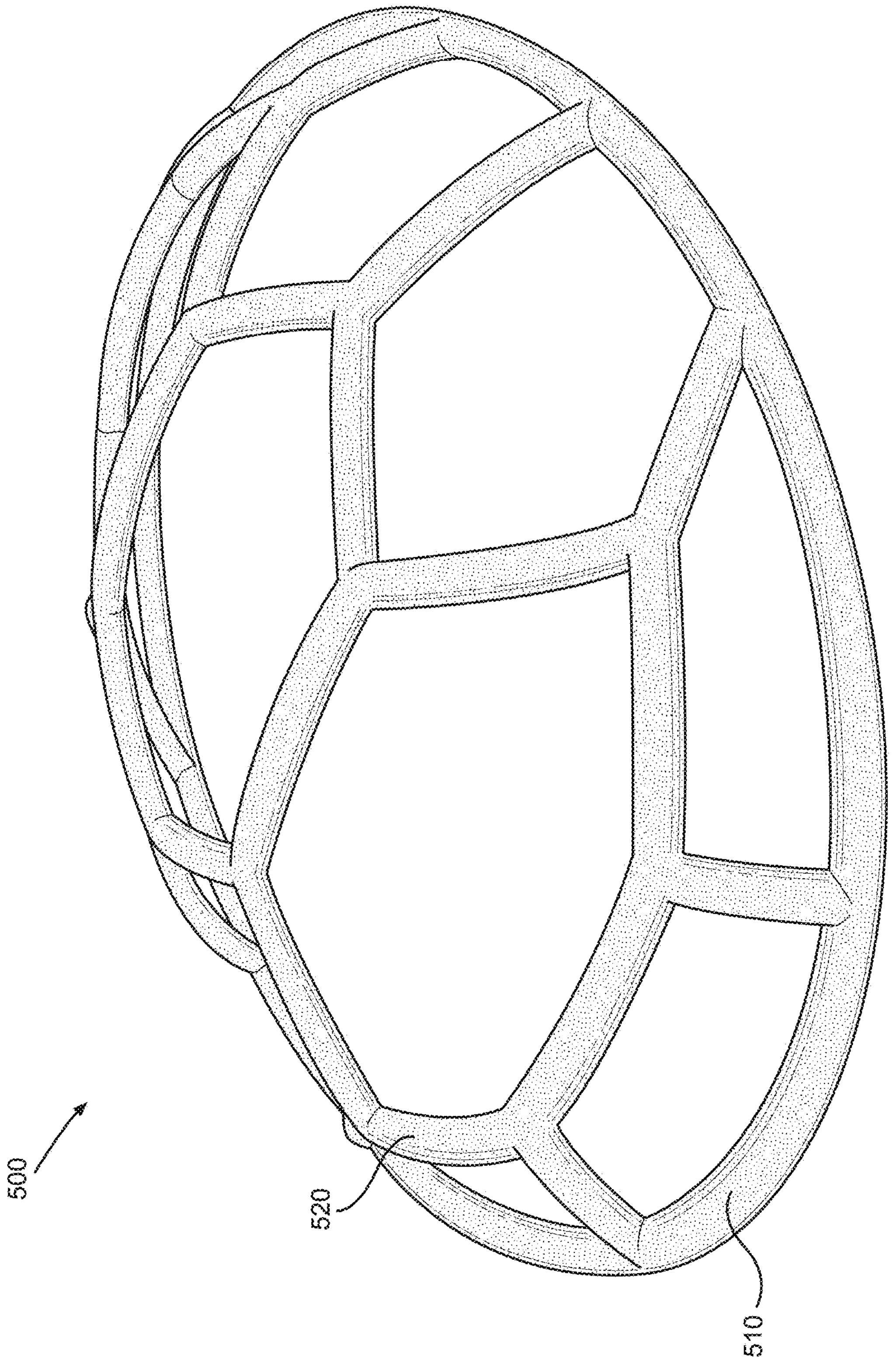
FIG. 5 illustrates in side perspective view an example turtle shell structure built by an airforming process according to one embodiment of the present disclosure.

FIG. 5 illustrates in side perspective view an example turtle shell structure built by an airforming process. Turtle shell structure 500 can be a singular structure built by an airforming process using a single balloon or support mold. Turtle shell structure 500 can be, for example, a "skeleton" structure that can stand alone or that can be used to form or attach other structural components thereat or thereupon. As such, turtle shell structure 500 can include a base 510 around a lower circumference thereof and a plurality of arms 520 extending therefrom and interconnecting to form a skeleton turtle shell shape.

Figure 6:
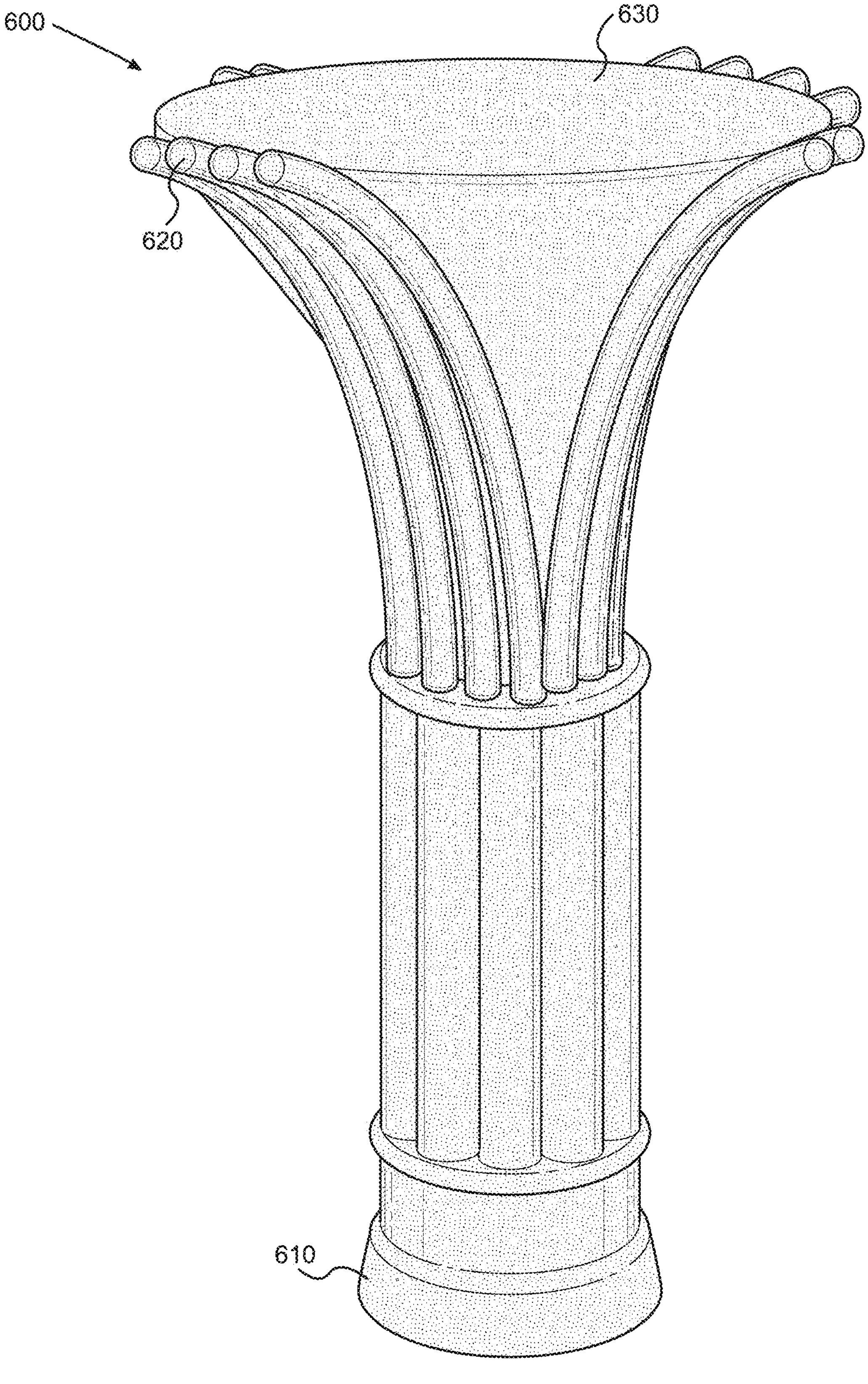
FIG. 6 illustrates in side perspective view an example column and lintel structure built by an airforming process according to one embodiment of the present disclosure.

FIG. 6 illustrates in side perspective view an example column and lintel structure built by an airforming process. Column and lintel structure 600 can be a combined structure built by an airforming process using multiple balloons or support molds. Column and lintel structure 600 can be, for example, a column and associated lintel or platform structure used to support various other components or other items thereupon. As such, column and lintel structure 600 can include a base 610, a plurality of lintels 620 extending upward therefrom, and a platform 630 contained within the lintels 620. The base 610 can be formed on the ground or a separate foundation and can be formed from a single balloon or support mold. One or two additional balloons or support molds can be used to form the lintels 620 and platform 630. In some arrangements, rebar support can also be inserted, such as in the form of a rebar beam frame to provide added support to the overall structure.

Figure 7:
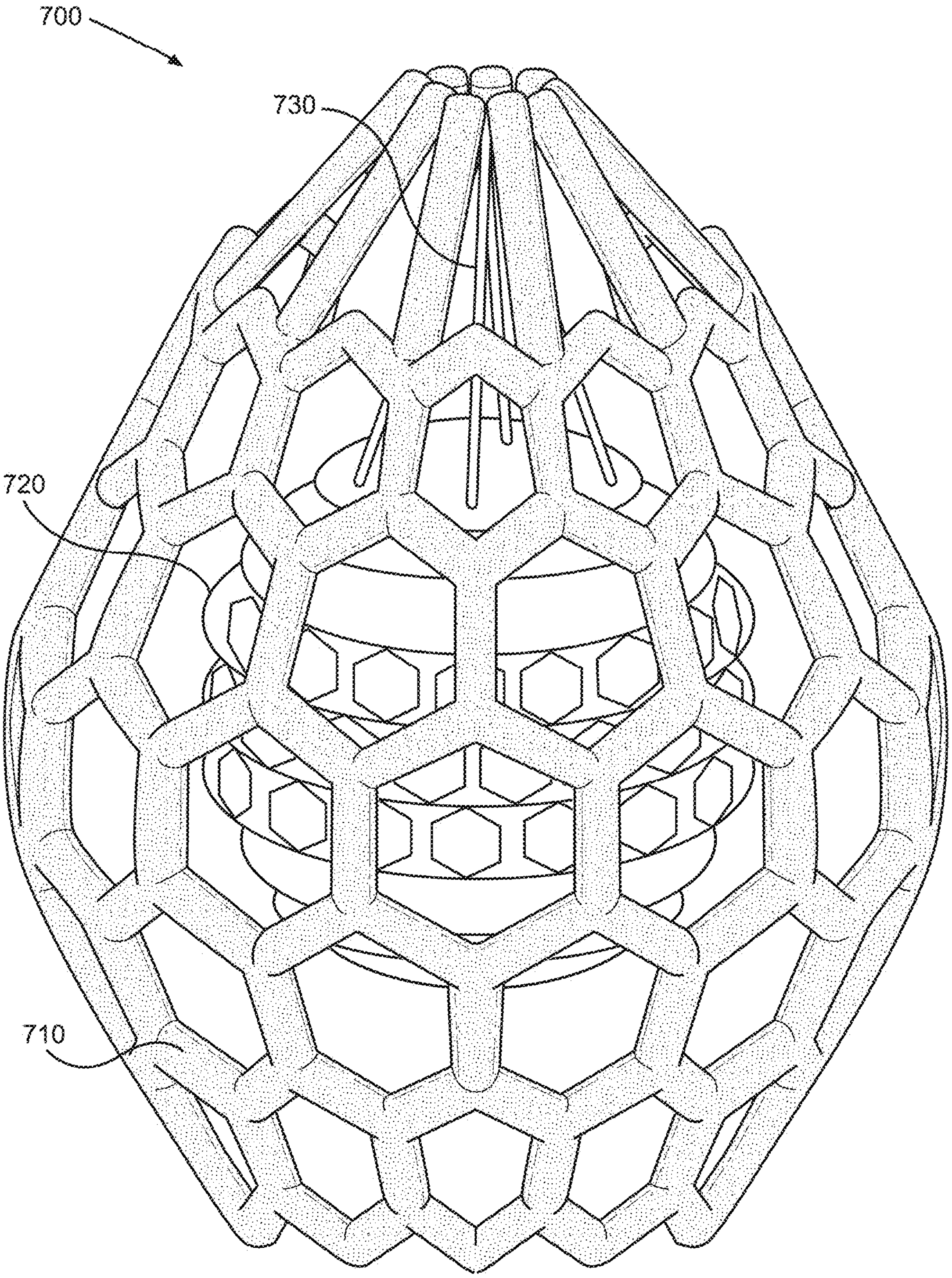
FIG. 7 illustrates in side perspective view an example outer and inner hive structure built by an airforming process according to one embodiment of the present disclosure.

FIG. 7 illustrates in side perspective view an example outer and inner hive structure built by an airforming process. Hive structure 700 can be a singular structure built by an airforming process using a single balloon or support mold or can be formed using two separate balloons or support molds. Hive structure 700 can be, for example, an overall outer structure that can be used to house other components and/or other items therein. As such, hive structure 700 can include an outer honeycomb or hive structure 710 and an internal structure 720 contained therein. A steel rope 730 or other suspension component can be used to suspend hive structure 700 in some arrangements.

Figure 8:
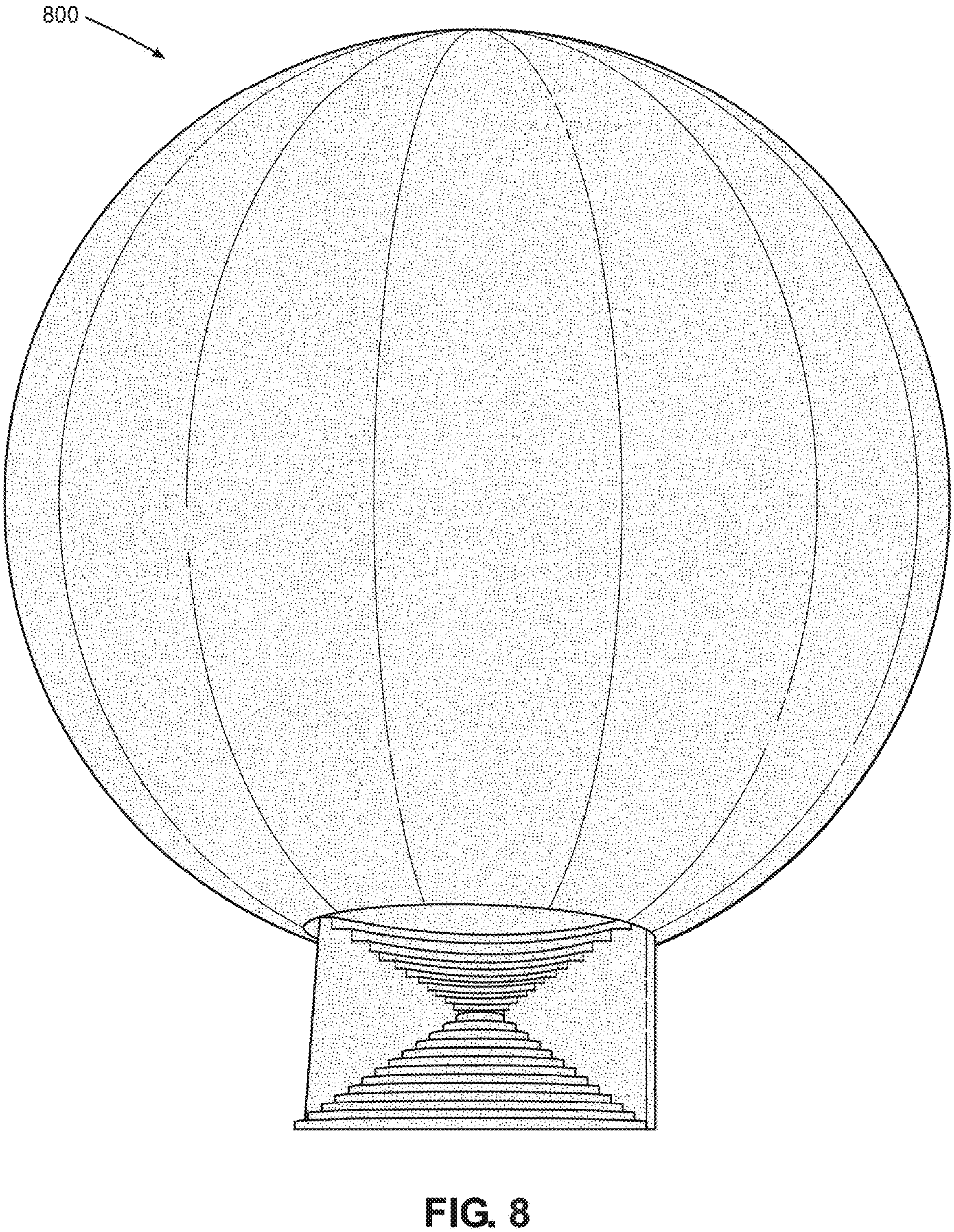
FIG. 8 illustrates in side perspective view an example hollow structure built by an airforming process according to one embodiment of the present disclosure.

Moving next to FIG. 8, an example hollow structure built by an airforming process is illustrated in side perspective view. Hollow structure 800 can be formed from concrete or concrete composite, for example, using one or more of the various airforming processes disclosed herein. In some arrangements, hollow structure 800 can be a room elevated with stairs formed thereunder leading into a room inside the hollow structure. Hollow structure 800 can be any size or shape, such as a cube, sphere, ball, pear, apple, or the like. In some arrangements, hollow structure 800 can be enclosed indoors within a larger building or structure, such as a cube shaped glass structure.

In various embodiments, hollow structure 800 can be a large indoor room, such as a conference room, reception area, or even a movie theater. For example, hollow structure 800 can be a movie theater having one or more projection units that project pictures and/or moving images or some or all of the internal walls of hollow structure 800. Fog, lasers, and other effects can be used for a more robust indoor presentation on the inner walls of hollow structure 800. Again, the texture of the inner walls can be set to a preferred smoothness and/or type by the texture of the mold used at the inner walls in forming the hollow structure 800. For example, a finely smooth inner wall texture can be set by having a very smooth textured mold at the inner wall surface, while a rough or customized tactile texture can be set by using a mold having a shape that is the inverse of the texture desired on the inner wall of hollow structure 800.

Figure 9A:
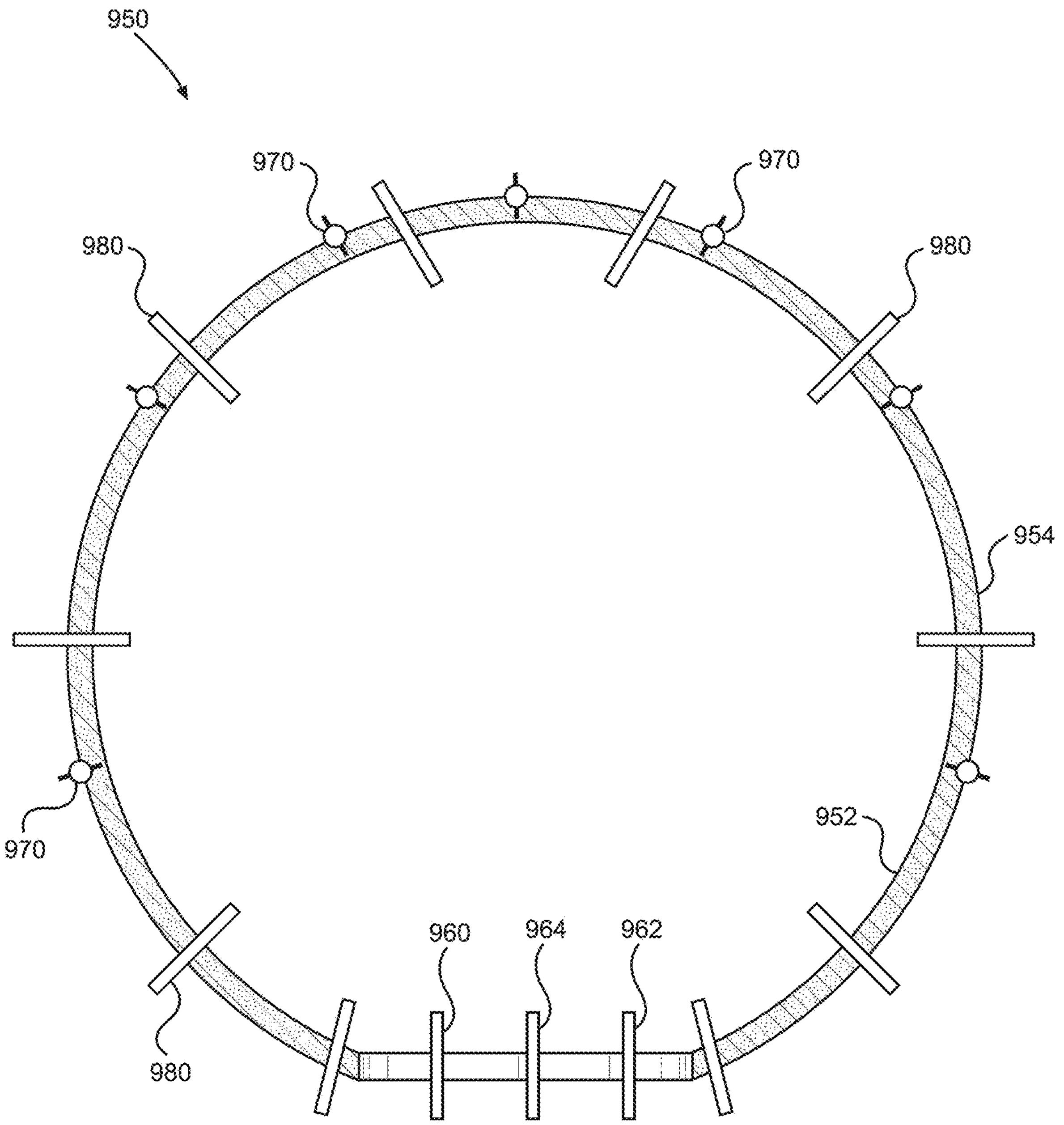
FIG. 9A illustrates in side cross-section view an example inflated double support mold during the creation of the example hollow room structure of FIG. 8 according to one embodiment of the present disclosure.

FIG. 9A illustrates in side cross-section view an example inflated double support mold used during the creation of the example hollow structure of FIG. 8. As will be readily appreciated, hollow structure 800 in FIG. 8 can be a relatively complex structure to form. As such, multiple support molds can be used to form this structure. For example, an inner support mold 952 can be contained within an outer support mold 954 to form a structure having a hollow interior, such as hollow room structure 900.

A first injector 960 can be used to fill the inner support mold 952 with air, another fluid support, or other structural material, and a second injector 962 can be used to fill the outer support mold 954 with air or other fluid. The other structural material can be a lightweight material designed to hold the shape of the inner support mold during construction, such as a foam material, for example. As will be readily appreciated, the fill volume for the second injector 962 can simply be the volume that is between the outer support mold 954 and the inner support mold 952. A third injector 964 can then be used to fill that same fill volume between the support molds with fluid structural material, such as fluid concrete or concrete composite.

One or more pressure valves 970 can be built into and placed along the outer support mold 954 to check and release pressure as may be needed during the inflation and/or filling of the outer support mold 954 with fluid structural material. Similar pressure valves may also be used for the inner support mold 952 as well, if desired. In addition, one or more separator system components 970 can be used to hold the inner support mold 952 and outer support mold 954 together at a set distance apart during the construction process.

Figure 9B:
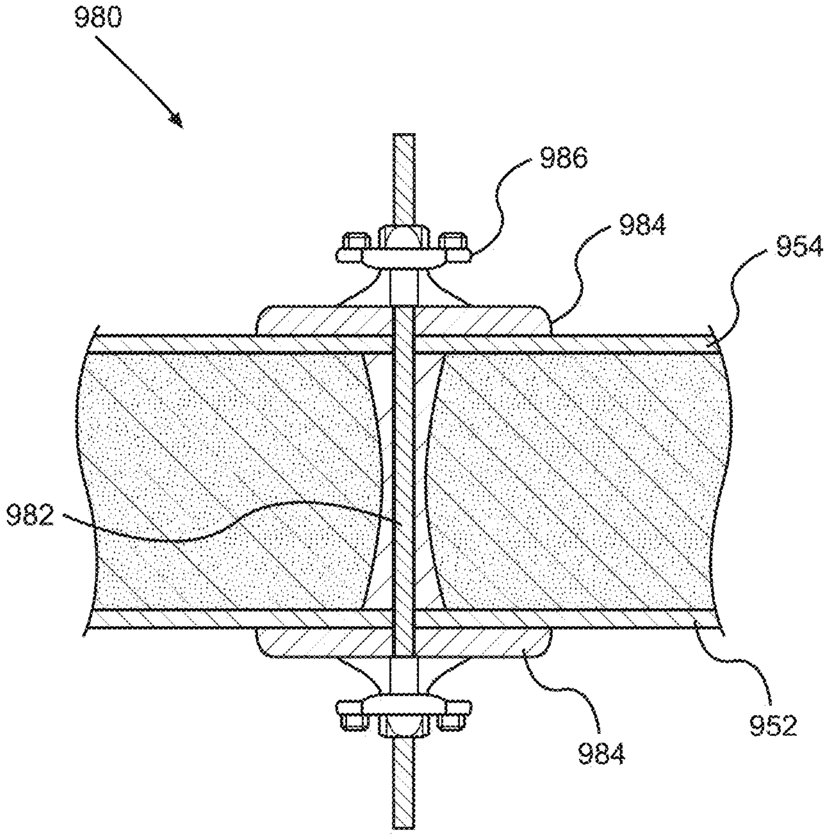
FIG. 9B illustrates in side cross-section view an example separator system component for use with the inflated double support mold of FIG. 9A according to one embodiment of the present disclosure.

FIG. 9B illustrates in side cross-section view an example separator system component for use with the inflated double support mold of FIG. 9A. Separator system component 980 can be used to hold inner support mold 952 and outer support mold 954 at a set distance apart during the airforming inflation and filling processes. In various arrangements, multiple identical or similar separator system components 980 can be spaced along the surfaces of the inner and outer support molds to facilitate a substantially uniform distance between the support molds, and thus a substantially uniform thickness in the finished hollow room structure or other structural component formed by a similar double support mold process. Each separator system component 980 can include a rigid separator pipe 982 having a length corresponds to the desired wall thickness of the final hollow structure. Contact boards 984 can be placed along the outer surfaces of both the inner support mold 952 and outer support mold 954, and the separator pipe 982 can run through these contact boards 984 and be affixed thereto with fastening nuts 986 at both outer surfaces of the support molds. Alternative structures may also be used to facilitate a uniform distance between support molds in such a double support mold arrangement.

Although many use cases can involve the formation of building structures or building structural components, the disclosed airforming processes can be used to create other types of structures. For example, airforming can be used to create statues or other free-standing decorative structures. Rather than the typical use of steel, bronze or other metals, statues made from concrete or concrete composite using the disclosed processes can be created much faster and at far less expense. Concrete or a concrete composite material may be used for such statue structures, or alternative structural materials may be used, as noted above.

Figure 10A:
FIG. 10A illustrates in side perspective view an example statue structure built by an airforming process according to one embodiment of the present disclosure.
Figure 10B:
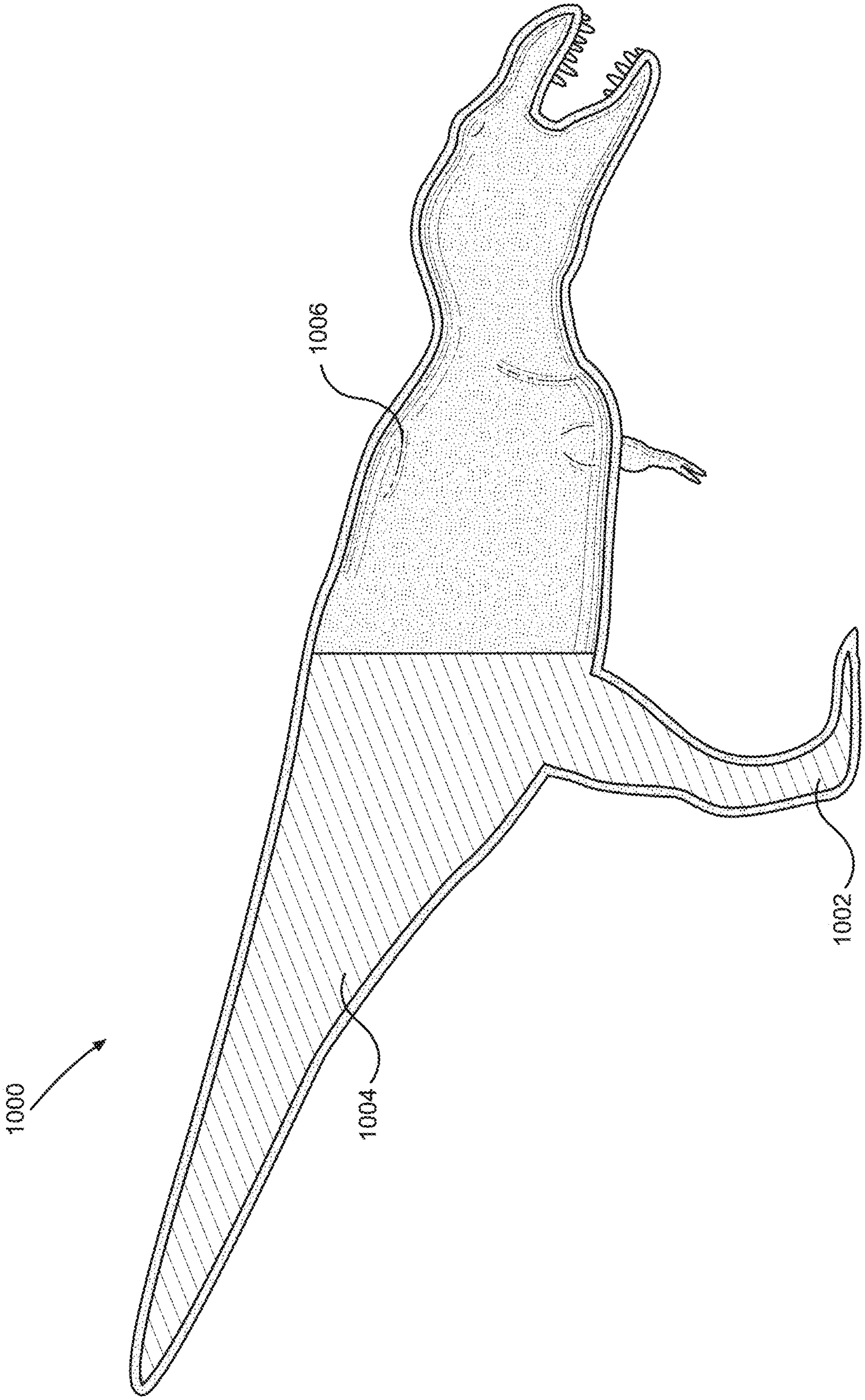
FIG. 10B illustrates in side cross-section view the example statue of FIG. 10A according to one embodiment of the present disclosure.

As shown in FIGS. 10A and 10B, a free-standing dinosaur statue 1000 can be formed using the disclosed airforming process. Formation of a wide variety of statue structure shapes and sizes can be accomplished by designing one or more support molds to manipulate the center of gravity of the statue. For example, where more of a statue structure design is to be toward one side of a statue foot or base 1002, then the weight of a solid portion 1004 of the statue 1000 on one side of the base 1002 can compensate for the weight of a hollow portion 1006 of the statue 1000 that extends farther away from the base 1002 on the opposite side of the solid portion.

In various embodiments, a statue or ornamental structure formed by the disclosed airforming processes can involve adding pigment to the fluid structural material during formation. For example, a concrete structure can have a brown pigment material added to the wet concrete during the formation of dinosaur statue 1000. Further painting or decorative materials can also be added to the finished hardened structure as desired. As noted above, the finished texture of dinosaur statue 1000 can also be set by adjusting the texture of the mold used to form the statue. For example, a coarsely textured mold can result in a coarse texture to the surface of the statue 1000 to mimic dinosaur skin. Varying surface textures can also be achieved by varying the texture at different locations on the mold. For example, a coarse texture can be used where coarse dinosaur skin is desired, while a smooth texture can be used for smooth finished surfaces, such as the surprised scientist.

As will be readily appreciated, the various structures and structural components of FIGS. 4-10B can represent just some of a wide variety of concrete and other structures that can be formed using the various airforming methods disclosed herein. In various embodiments, one or more support molds can be defined with any shape, size, and complexity. The material for each support mold can be a fiberglass resin, or any other suitable material, such as, for example, a plastic-like or fiberglass and epoxy fabric. The fiberglass and epoxy fabric can be made to harden in 24 hours after wetting it. In some arrangements, the formwork made with the support mold can be for a single use, after which it is torn down after the concrete hardens. That is, the support mold itself does not form any part of the finally formed structure.

In some embodiments, each support mold can be a single use support mold that is destroyed or discarded after removal. In alternative embodiments, one or more support molds can be reusable. For example, some support molds may be removable in a way that they can be reused to make the same structure several times. Some support molds may even be removable and reusable an indefinite number of times. To facilitate such reusable support molds, one or more flaps, seals, zippers, or other suitable features can allow for the removal of the support mold after casting without breaking the reusable support mold.

In various embodiments, fluid construction material may not be limited to concrete. In fact, any other material that can be poured into a mold as a homogeneous fluid that hardens later to produce a structural solid can be employed. For instance, for space applications alternative construction materials may include hardening plastics, epoxies, or other suitable structural materials, as noted above. In some arrangements, a support mold can be heated to make sure the structural material stays liquid and will solidify simply by turning the heating off.

In various embodiments, one or more support molds can be compartmentalized, such that a single support mold can have connected sections that can be inflated separately. This can allow for better control of the overall mold and finished structure, particularly for relatively large and/or complex shapes and applications.

In some embodiments, a post-tensioning process can be used. For example, a sleeve or pipe can be placed inside the support mold with ends fixed to its interior so that it will be accessible once the support mold is stripped or otherwise removed. The sleeve may contain anchorage elements or these may be applied on the outside. The sleeve can be a separate item or could be an integral part of the support mold, built continuously with the same fabric and producing a "pipe" inside the final hardened concrete. Alternatively, a "hard balloon" epoxy option can involve drilling a hole on both ends, passing a pipe therethrough, and closing the ends before casting fluid concrete or any other suitable fluid structural material.

In various embodiments, support molds can be designed such that mold edges are beveled or cast with a chamfer, which then results in a finished hardened structure having the bevel or chamfer. The bevel helps with stripping and demolding, as it guarantees there are no straight or acute angles which may lead to chipping of the edges. Another advantage of incorporating one or more bevels and/or chamfers is that these features can hide minor and unavoidable casting defects that may otherwise be more noticeable after assembly.

In the disclosed embodiments, the natural shape of the inflatable support mold can replace a bevel for a fillet shape, allowing for rounded edges which are a desired design decision that may usually be discarded due to a relatively complex or difficult execution. Alternative design arrangements can take into consideration the material used to produce the different elements, to limit the minimum feature size and sharpness of the finished edges. Should it be the case that the design requires sharp edges, there are always aesthetic finishing elements that can be applied and added to the structure at the moment of plastering, tiling, painting, and the like.

In various embodiments the finished structure or structural component comprises a composite concrete that does use any form of reinforcement rebar or other separate material. In fact, it is specifically contemplated that the disclosed structures are formed from a single homogenously mixed composite material, with no other added materials or separate strengthening components. In some arrangements, the concrete portion of the composite concrete material can include a high dosage of cement and fine particles per volume unit, which can be up to twice as much as regular precast concrete. Generally, a smaller sized aggregate can provide a "micro-concrete" material. For example, some micro-concrete materials can have maximum sizes of about 2 mm. Types of concrete used can include self-compacting concrete, lightweight concrete, and/or ultra-high performance concrete, as defined by the American Concrete Institute.

Because most forms of concrete can experience shrinkage, with the associated stresses and tensions, the homogenous composite concrete mixture can include high dosages of fibers, and possibly a combination of different fiber types (e.g., metallic, polymeric, others) to counteract these shrinkage effects. In addition to typical structural fibers, smaller "anti-cracking" fibers can be added to the composite concrete material to reduce or eliminate minor cracks that can occur due to shrinkage.

There are many different types of fibers that are applicable in concrete, ranging from the widespread and standardized ones to the very experimental; one can also consider a fabric reinforcement to be "structured" fiber reinforcement, and there are also fibers and fabrics that are applied on the surface of an element instead of dispersed into the mass of the concrete. Focusing on fibers, there are two main categories: structural and non-structural. Structural fibers are, at least, as long as the larger aggregate particles, so that they can tangle these particles and transmit their structural properties to the concrete. Different types of fibers that can be included in the composite concrete mixture can include steel or "Dramix" fibers, structural polypropylene fibers, non-structural polypropylene fibers, among others.

In various embodiments, aluminum alloy fibers can be mixed into the concrete material. Such aluminum alloy fibers can be formed by cutting up aluminum beverage cans, for example. In some arrangements, this can involve removing the top and bottom of an aluminum beverage can and then cutting the sidewalls of the can into ribbons to form the fibers. The ribbons or fibers can have a length of about 30 mm or less and a thickness of about 2 mm or less in some arrangements. The widths of the ribbons or fibers can vary, as may be suitable for a given application or structure.

In addition to including fibers in the construction materials, it is also contemplated to have fibers built in into the fabric of the support mold. For example, one approach can involve creating a fiberglass and epoxy balloon or support mold that can hold its shape once inflated by wetting the epoxy and letting it harden. The addition of fibers in the support mold can serve to strengthen the support mold fabric material to allow for larger and more complex structures.

Figure 11A:
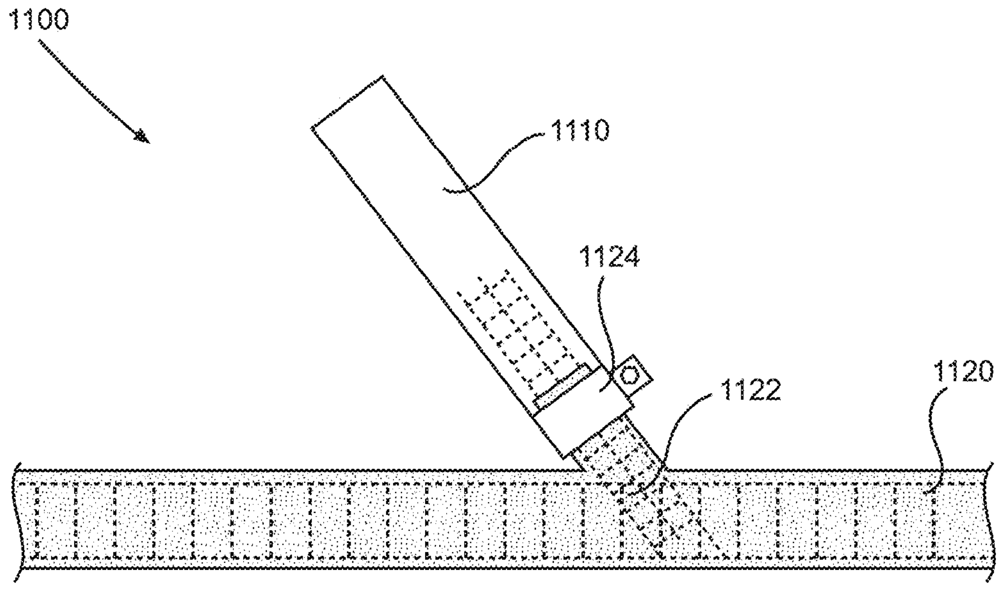
FIG. 11A illustrates in side cross-section view an example support mold to foundation connection with reinforcing steel bars according to one embodiment of the present disclosure.
Figure 11B:
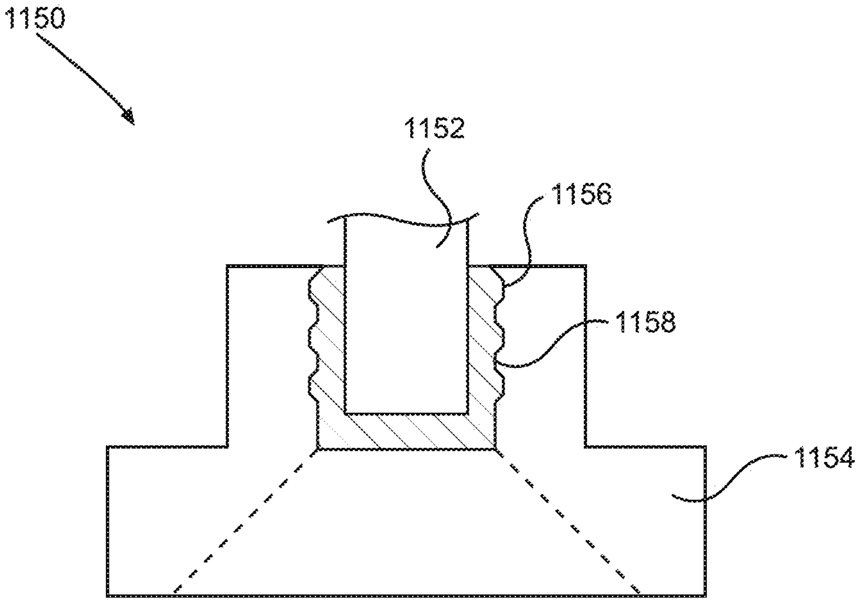
FIG. 11B illustrates in front cross-section view an example support mold to foundation socket connection according to one embodiment of the present disclosure.

FIGS. 11A and 11B illustrate example mold to foundation connections in side cross-section and front cross-section views respectively. Arrangement 1100 of FIG. 11A provides one approach for connecting a mold structure with an existing foundation. Prior to the assembly and installation of one or more molds 1110, the overall structure foundations 1120 can be finished and prepared to connect with the structural element or elements that will be cast using the mold(s) 1110. One or more rebar components 1122 can extend from overall structure foundation 1120, where they can be coupled to structure formed within a mold 1110 using a connection flange 1124. Foundations and footings can follow any suitable standard industrial procedure for precast construction.

Arrangement 1150 of FIG. 11B provides another approach for connecting a mold structure with an existing foundation. As shown, this can involve a vertical element, such as a precast column 1152, which can be partially introduced into a socket 1154 and fixed in place after assembly. Alternative features such as bolted column shoes, anchor bolts, and/or welded anchor plates may also be used. In some arrangements, a ribbed lost formwork element 1156 can be used, which remains embedded into the concrete and guarantees a good connection with the footing socket. A gap between this element and the foundation socket can be filled with cementitious grout 1158 or other suitable material, as can be a common procedure in precast construction. A metallic element can be connected to the mold in some arrangements.

Figure 12:
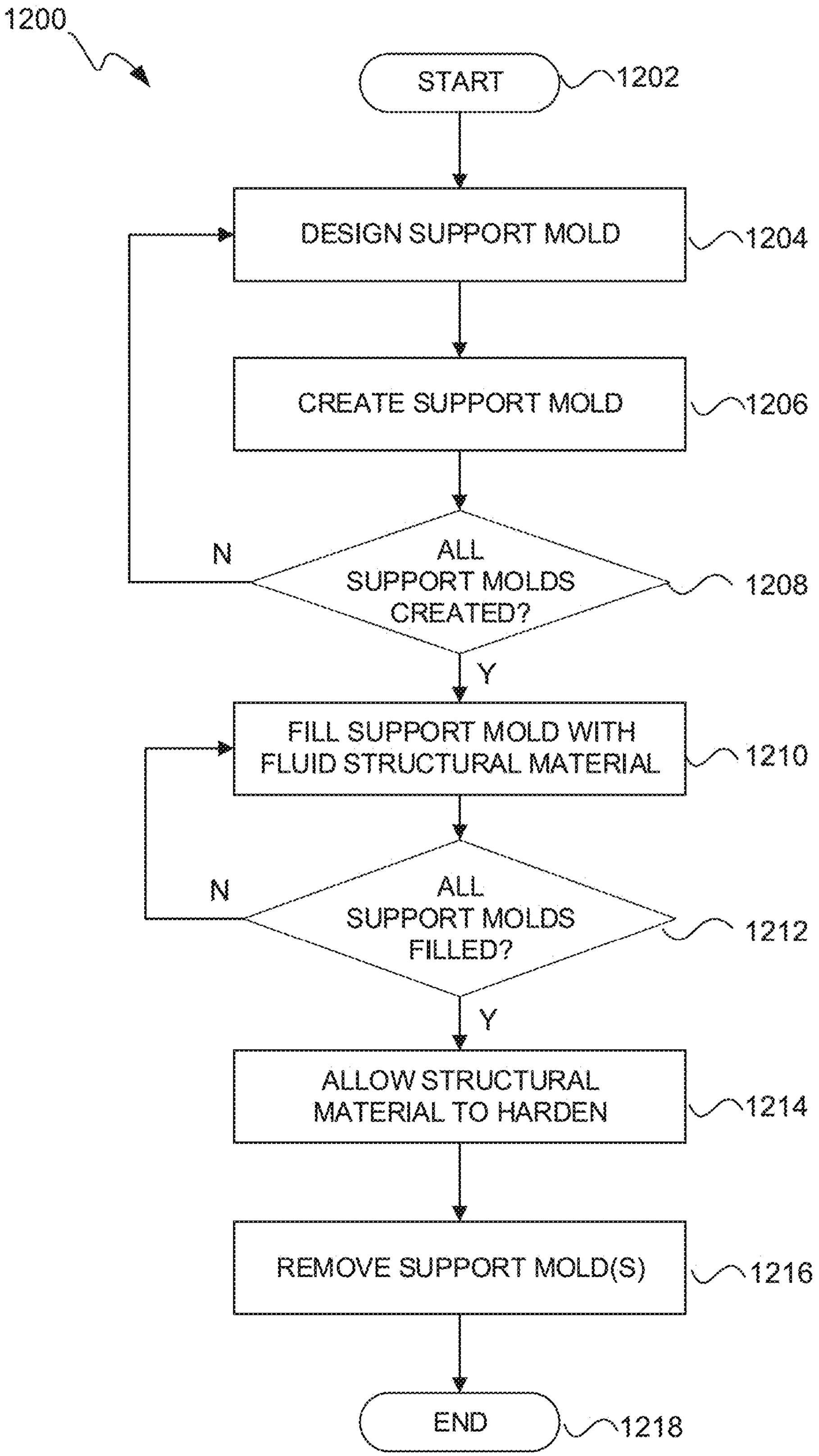
FIG. 12 illustrates a flowchart of an example alternative method of forming a structure using an alternative formation process according to one embodiment of the present disclosure.

FIG. 12 illustrates a flowchart of an example alternative method 1200 of forming a structure using an alternative formation process. Alternative method 1200 can be similar to method 200 above, with the notable exception that the support mold need not first be inflated with air or any other fluid. Rather, the fluid concrete or other structural material can be filled into the support mold directly without any prior fluid inflation. It will be readily appreciated that method 1200 generally provides an alternative formation process in greater detail, and that various steps and details not shown may also be included. For example, added details can include forming multiple structural components using multiple separate support molds to arrive at an overall combined structure. Again, the overall structure can be a building, a statue, or any other suitable structure as may be desired.

After a start step 1202, a first process step 1204 can involve designing a support mold. This can include determining what a desired final structural component should be, and then using software and/or other planning techniques to design a support mold that will result in the desired final structural component.

At a subsequent process step 1206, the support mold can be created according to the design determined in step 1204. Again, the support mold can be formed from a fiberglass resin material having a suitable thickness and strength. Alternatively, a flexible plastic fabric material may be used rather than fiberglass resin. In still other arrangements, a flexible epoxy and fiberglass material can be used to create the support mold.

At a following decision step 1208, an inquiry can be made as to whether all desired support molds have been created. If not, then steps 1204 and 1206 can be repeated until the desired number of support molds have been created to be able to form all of the multiple structural components desired to arrive at an overall structure. In some arrangements, step 1204 can be repeated until all support molds have been designed, followed by step 1206 being repeated until all support molds have been created using the designs.

At the next process step 1210, a support mold can be filled directly with a fluid structural material, such as a wet concrete composite material, for example. The fluid structural material can be any of the materials set forth above, such as those having one or more fibrous materials embedded therein.

At a subsequent decision step 1212, an inquiry can be made as to whether all of the support molds have been filled with the fluid structural material. If not, then step 1210 can be repeated and additional structural molds can be filled until all desired structural molds have been filled.

At the next process step 1214, the fluid structural material can be allowed to harden inside of the support mold or molds. Again, this can take about 48 to 72 hours, although other lengths of time are also possible depending on the specific material used, the temperature, and the size of the overall hardened structure.

At a following process step 1218, the support mold or molds can then be removed to leave the finished structural component or components. This can involve removing and potentially destroying a single use support mold, or a careful removal of a reusable support mold, as may be applicable. The method then ends at end step 1220.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A system configured to form a hollow architectural structure, the system comprising:

an inner support mold having a first thickness and a first injector, wherein the inner support mold includes a flexible and inflatable material and is configured to be substantially filled with a fluid support or structural material via the first injector;

an outer support mold arranged around the inner support mold and having a second thickness and a second injector, wherein the outer support mold includes a flexible and inflatable material and is configured to be substantially filled with a fluid structural material via the second injector such that the fluid structural material substantially fills the volume between the outer support mold and the inner support mold; and multiple separator system components coupled to the inner support mold and the outer support mold and spaced along the surfaces of the inner and outer support molds around the entire system, the one or more separator system components holding apart the inner support mold from the outer support mold a set distance at multiple locations along the inner support mold and outer support mold around the entire system, wherein each of the multiple separator system components includes a rigid separator pipe and contact boards at outer surfaces of the inner support mold and outer support mold such that the inner support mold, outer support mold, rigid separator pipe, and fluid structural material are all between the contact boards, and wherein the system is configured to form a hollow architectural structure from the fluid structural material when the fluid structural material hardens within the system.

2. The system of claim 1, wherein the fluid structural material includes concrete.

3. The system of claim 1, wherein the hollow architectural structure is a room and the hardened fluid structural material forms one or more walls of the room.

4. The system of claim 1, wherein the outer support mold includes one or more pressure valves configured to release pressure when the outer support mold is filled with the fluid structural material.

5. The system of claim 1, wherein each rigid separator pipe defines a length that corresponds to a desired wall thickness of the hollow architectural structure.

6. An airforming constructive system, comprising:

a flexible and inflatable support mold having an outer layer and an internal hollow region, wherein the internal hollow region defines a shape having a base region coupled and combined with a plurality of elongated cylindrical arm regions, and wherein the support mold is configured to be filled with one or more fluids;

one or more inlets formed through the outer layer, wherein the one or more inlets are configured to facilitate inflating the support mold with an inflation fluid and to fill substantially the inflated support mold with a fluid structural material such that the fluid structural material takes substantially the full shape of the inflated first support mold; and one or more fluid escape outlets formed through the outer layer, wherein the one or more fluid escape outlets are configured to facilitate the escape of most or all of the inflation fluid from the support mold while the support mold is substantially filled with the fluid structural material, and wherein the support mold is further configured to allow the fluid structural material to harden therein to become a hardened structural material that forms at least a portion of an architectural structure.

7. The airforming constructive system of claim 6, wherein the support mold includes a fiberglass resin balloon.

8. The airforming constructive system of claim 6, wherein the inflation fluid is air.

9. The airforming constructive system of claim 6, wherein the fluid structural material includes a fluid concrete composite material and the hardened structural material includes a hardened concrete composite material.

10. The airforming constructive system of claim 9, wherein the fluid concrete composite material includes fibers mixed therein, the fibers having an aluminum alloy component, a thickness of less than about 2 mm, and a length of less than about 30 mm.

11. The airforming constructive system of claim 6, wherein the architectural structure forms all or part of a building or a statue.

12. The airforming constructive system of claim 6, wherein the support mold includes a customized texture at its inner surfaces, and wherein the customized texture results in a corresponding customized surface texture of the architectural structure.

13. The airforming constructive system of claim 6, wherein the architectural structure includes at least a first structural component having a first curved and non-planar geometry and a second structural component having a second curved and non-planar geometry that is substantially different than the first curved and non-planar geometry, and wherein the first structural component and second structural component are formed using the airforming constructive system.

14. The airforming constructive system of claim 6, wherein each of the plurality of elongated cylindrical arm regions extends outward from the base region.

15. A method of forming an architectural structure using the system of claim 6, the method comprising:

inflating a first support mold with an inflation fluid, wherein the first support mold includes one or more fluid escape outlets and also includes a flexible and inflatable material;

filling substantially the inflated first support mold with a fluid structural material such that the fluid structural material takes substantially the full shape of the inflated first support mold, wherein most or all of the inflation fluid escapes from the first support mold through the one or more fluid escape outlets during the filling; and allowing the fluid structural material to harden within the substantially filled first support mold, wherein the hardened structural material forms at least a portion of the architectural structure.

16. The method of claim 15, wherein the inflating fluid includes air, the fluid structural material includes a fluid concrete composite material, and the hardened structural material includes a hardened concrete composite material.

17. The method of claim 15, wherein the architectural structure includes at least a first structural component having a first curved and non-planar geometry and a second structural component having a second curved and non-planar geometry that is substantially different than the first curved and non-planar geometry.

18. The method of claim 15, further including the steps of:

inflating a second support mold with the inflation fluid;

filling substantially the inflated second support mold with the fluid structural material such that the fluid structural material takes substantially the full shape of the inflated second support mold, wherein most or all of the inflation fluid escapes from the second support mold through the one or more fluid escape outlets during the filling; and allowing the fluid structural material to harden within the substantially filled second support mold, wherein the hardened structural material forms at least a portion of the architectural structure.

19. The method of claim 15, further including the step of:

connecting the first support mold with an existing building foundation.

20. The method of claim 15, wherein the architectural structure forms all or part of a building or a statue.

* * * * *